United States Patent [19]

Inoue et al.

[11] Patent Number: 4,869,967
[45] Date of Patent: Sep. 26, 1989

[54] MULTI-LAYER MOLDED ARTICLE AND PROCESS FOR PRODUCING SAME

[75] Inventors: Toshihide Inoue, Ichinomiya; Masaru Okamoto, Tokai; Toru Yamanaka, Nagoya, all of Japan

[73] Assignee: Director General of the Agency of Industrial Science and Technology, Tokyo, Japan

[21] Appl. No.: 161,906

[22] Filed: Feb. 29, 1988

[51] Int. Cl.[4] ............................................. B32B 27/06
[52] U.S. Cl. .................................... 428/480; 428/483; 428/523
[58] Field of Search ........................ 428/480, 483, 523

[56] References Cited

U.S. PATENT DOCUMENTS 4,572,852  2/1986  Gartland et al. ............... 428/480 X
4,623,710  11/1986 Takase et al. .................. 428/480 X
4,713,269  12/1987 Jabarin et al. ................. 428/480 X
4,726,998  2/1988  Ikenaga et al. ................ 428/480

Primary Examiner—Thomas J. Herbert
Attorney, Agent, or Firm—Scully, Scott, Murphy & Presser

[57] ABSTRACT

A multi-layer molded article having good interlayer adhesion and exhibiting high modulus even when its thickness is large, which comprises at least one layer formed by an anisotropic melt-forming polyester having structural units selected from the following structural units (I) to (III), the molar ratio of (I)/[(I)+(II)+(III)] being in the range of 20 to 100 mol %:

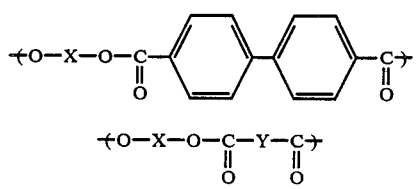

-continued

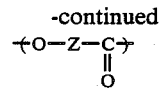

wherein X represents at least one group selected from

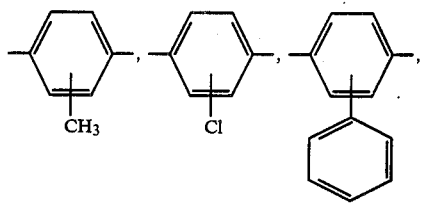

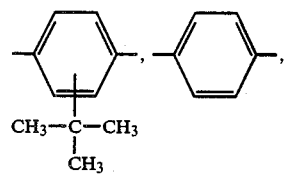

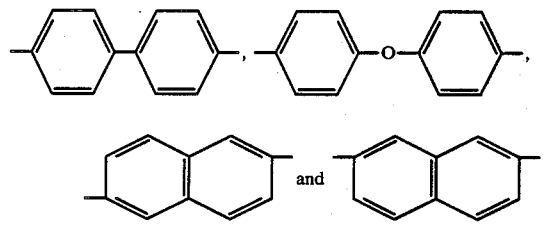

Y represents at least one group selected from (Abstract continued on next page.)

11 Claims, 2 Drawing Sheets

MULTI-LAYER MOLDED ARTICLE AND PROCESS FOR PRODUCING SAME

BACKGROUND OF THE INVENTION

The present invention relates to a multi-layer molded articles containing at least one layer of a specific anisotropic melt-forming polyester, and a process for producing same.

There has recently been an increasing demand for plastics of higher performance and a number of polymers exhibiting various novel performances have been developed and marketed. Above all, optically anisotropic liquid crystal polymers having a parallel arrangement of molecular chains have been attracting a special attention in that they have superior mechanical properties.

As polymers which form anisotropic melt there are known, for example a liquid crystal polymer prepared by copolymerizing p-hydroxybenzoic acid with polyethylene terephthalate components (JP 49072393A), a liquid crystal polymer prepared by copolymerizing p-hydroxybenzoic acid with 6-hydroxy-2-naphthoic acid (JP 54077691A), and a liquid crystal polymer prepared by copolymerizing p-hydroxybenzoic acid with 4,4'-dihydroxybiphenyl and terephthalic or isophthalic acid (JP 57024407B and JP 60025046A).

However, it is known that when those known liquid crystal polyesters are subjected to forming in a conventional manner, the resulting moldings are lower in modulus with increase of their thickness although a relatively high modulus is obtained when the moldings thickness is small [see W. J. Jackson, et al., J. Polym. Sci. Polm. Chem. Ed., 14, 2043 (1976)].

SUMMARY OF THE INVENTION

It is an object of the present invention to provide a multi-layer molded article capable of maintaining a high modulus equal to that of a thin molded article even when its thickness is large, as well as a method of producing same.

It is another object of the present invention to provide a multi-layer molded article having a high interlayer adhesion, and a process for producing same.

It is a further object of the present invention to provided multi-layer molded article obtained using a specific anisotropic melt-forming resin which exhibits good melt fluidity in injection molding and affords a molded article extremely high in modulus, as well as a process for producing same.

In order to achieve the above-mentioned objects, the present invention resides in a multi-layer molded article characterized in that at least one layer is formed by an anisotropic melt-forming polyester having structural units selected from the following structural units (I) to (III), the molar ratio of (I)/[(I)+(II)+(III)] being in the range of 20 to 100 mol%, or said at least one layer is formed by an aromatic polyester composition comprising said anisotropic melt-forming polyester and 0.1 to 60 parts by weight, based on 100 parts by weight of said anisotropic melt-forming polyester, of an olefinic polymer:

(I)

(II)

(III)

wherein X represents at least one group selected from and,

Y represents at least one group selected from and Z represents at least one group selected from

BRIEF DESCRIPTION OF THE DRAWINGS

FIGS. 1-A to I are sectional views of multi-layer molded article obtained according to the present invention;

DESCRIPTION OF THE PREFERRED EMBODIMENTS

In the aromatic polyester used in the present invention, the above structural unit (I) is produced from at least one dihydroxy compound selected from methylhydroquinone, chlorohydroquinone, phenylhydroquinone, t-butylhydroquinone, hydroquinone, 4,4'-dihydroxybiphenyl, 4,4'-dihydroxydiphenylether, 2,6-dihydroxynaphthalene and 2,7-dihydroxynaphthalene, and 4,4'-diphenyldicarboxylic acid. The structural unit (II) is produced from at least one dihydroxy compound selected in the same manner as the structural unit (I) and at least one dicarboxylic acid selected from 1,2'-bis(phenoxy)ethane-4,4'-dicarboxylic acid, 1,2-bis(2-chlorophenoxy)ethane-4,4'-dicarboxylic acid, terephthalic acid, isophthalic acid, 2,6-naphthalenedicarboxylic acid, 4,4'-diphenyl ether dicarboxylic acid and 1,4-cyclohexanedicarboxylic acid. The structural unit (III) is produced from at least one aromatic hydroxycarboxylic acid selected from p-hydroxybenzoic acid, 6-hydroxy-2-naphthoic acid, 3-chloro-4-hydroxybenzoic acid and 3-phenyl-4-hydroxybenzoic acid.

In the structural units of the polyester used in the present invention, the molar ratio of (I)/|(I)+(II)+(III)| is in the range of 20 to 100 mol%, preferably 50 to 100 mol%, and the molar ratio. of (I)/[(I)+(II)] is preferably in the range of 70 to 100 mol%, and that of (III)/[(I)+(II)+(III)] is preferably in the range of 0 to 75 mol%.

A molar ratio of (I)/[(I)+(II)+(III)] smaller than 20 mol% would result in insufficient modulus, poor adhesion and easy occurrence of cleavage, so is not practical.

It is preferable in point of interlayer adhesion that the heat of fusion of the polyester used in the present invention be not higher than 0.1 cal/g as measured using a differential scanning calorimeter (DSC).

Aromatic polyesters which form anisotropic melt and which are employable in the invention, preferably have a melt viscosity in the range of 10 to 15,000 poise as measured at a temperature 60° C. higher than the temperature (liquid crystal initiation temperature) as the initial exhibiting temperature of anisotropy and at a shear rate of 1,000 (1/sec).

Since the polyester used in the present invention has a high modulus and good interlayer adhesion, a multi-layer molded article containing this polyester as one layer is characteristic in that its modulus is high even when its thickness is larage.

The aromatic polyesters used in the present invention can be prepared by various processes. The following methods (1) to (4) are mentioned as typical examples.

(1) Preparation by polycondensation involving removal of monocarboxylic acid, from diester of an aromatic dicarboxylic acid or monoester of an aromatic hydroxy caroxylic acid and an aromatic dicarboxylic acid such as 4,4'-diphenyl-dicarboxylic acid.

(2) Preparation by polycondensation involving removal of acetic acid, from an aromatic dihydroxy compound or aromatic hydroxy carboxylic acid, an aromatic dicarboxylic acid such as 4,4'-diphenyldicarboxylic acid, and acetic anhydride.

(3) Preparation by polycondensation involving removal of phenol, from an aromatic dihydroxy compound, diphenyl ester of an aromatic dicarboxylic acid such as 4,4'-diphenyldicaroxylic acid and phenyl ester of an aromatic hydroxy carboxylic acid.

(4) Preparation by polycondensation involving removal of phenol, which comprises reacting a desired amount of diphenyl carbonate with an aromatic hydroxy carboxylic acid and an aromatic dicarboxylic acid such as 4,4'-diphenyldicarboxylic acid to obtain respective esters and then adding an aromatic dihydroxy compound.

Typical examples of catalyst used in the polycondensation include metallic compounds such as stannous acetate, tetrabutyl titanate, lead acetate, sodium acetate, potassium acetate, antimony trioxide, magnesium and trisodium phosphate. They are effective especially in the polycondensation involving removal of phenol.

In polycondensation for preparation of the polyesters of the present invention, in addition to the components which constitute the structural units (I), (II) and (III) there also may be copolymerized aromatic dicarboxylic acids such as 3,3'-diphenyldicarboxylic acid, 2,2'-diphenyldicarboxylic acid and 3,4'-diphenyletherdicarboxylic acid, alicyclic dicarboxylic acids such as hexahydrophthalic acid, aromatic dihydroxy compounds such as 1,4-dihydroxynaphthalene and 3,4'-dihydroxydiphenyl ether, m-hydroxybenzoic acid, p-aminophenol, p-aminobenzoic acid and the like, these additional components may be used in a small portion not impairing the object of the present invention.

It is preferable in point of interlayer adhesion that a composition obtained by adding 0.1 to 60 parts by weight, based on 100 parts by weight of the above polyester, of an olefinic polymer is used as at least one layer.

As examples of the olefinic polymer are mentioned α-olefinic polymers such as a copolymer of an α-olefin and a glycidyl ester of an α,β-unsaturated carboxylic acid and a modified ethylenic polymer obtained by grafting an unsaturated carboxylic acid or a derivative thereof onto a copolymer of ethylene, an α-olefin having 3 or more carbon atoms and optionally a non-conjugated diene.

In the above copolymer of an α-olefin and a glycidyl ether of an α,β-unsaturated carboxylic acid, examples of the α-olefin include ethylene, propylene and butene-1, with ethylene being preferably used. The glycidyl ether of an α,β-unsaturated carboxylic acid is represented by the general formula wherein R is hydrogen or lower alkyl. Examples include glycidyl acrylate, glycidyl methacrylate and glycidyl ethacrylate, with glycidyl methacrylate being preferably used. Such glycidyl ester may be preferably copolymerized in the ragne of 1 to 50 mol%. Other copolymerizable unsaturated monomers may also be copolymerized in the range of less than 40 mol%. Examples of such comonomers include vinyl ethers, vinyl esters such as vinyl acetate and vinyl propionate, ester (e.g. methyl, ethyl, propyl esters) of acrylic acid and methacrylic acid, acrylonitrile and styrene.

In the above modified ethylene polymers, the unsaturated carboxylic acid or derivative thereof may be grafted usually in the amount of 0.01 to 10% by weight onto the unmodified ethylenic copolymer of ethylene, an -olefin and optionally a non-conjugated diene.

In the above unmodified ethylenic copolymers, examples of the α-olefin having 3 or more carbon atoms include propylene, butene-1, pentene-1,3-methylpentene-1 and octene-1, with propylene and butene-1 being preferably used. Examples of the non-conjugated diene include norbornenes such as 5-methylidene-2-norbornene, 5-ethylidene-2-norbornene, 5-vinyl-2-norbornene and 5-propenyl-2-norbornene, dicyclopentadiene, methyltetrahydro-indene, 1,5-cyclooctadiene, 1,4-hexadiene and isoprene, with 5-methylidene-2-norbornene, 5-ethylidene-2-norbornene, dicyclopentadiene and 1,4-hexadiene being preferably used.

The copolymerization ratio of ethylene /α-olefin in the unmodified ethylenic copolymer not containing any non-conjugated diene component is preferably 40/60 to 99/1 (molar ratio), more preferably 70/30 to 95/5 (molar ratio).

The copolymerization amounts of the α-olefin and non-conjugated diene in the non-conjugated diene component-containing unmodified ethylenic copolymer are preferably 5 to 80 mol% and 0.1 to 20 mol%, more preferably 20 to 60 mol% and 0.5 to 10 mol%, respectively.

Examples of the unmodified ethylenic copolymer include ethylene/propylene copolymer, ethylene/butene-1 copolymer, ethylene/propylene/dicyclopentadiene copolymer and ethylene/prophylene/5-ethylidene-2-norbornene copolymer with ethylene/propylene copolymer and ethylene/butene-1 copolymer, both of which do not contain any non-conjugated diene, being preferable in point of heat resistance.

As examples of the unsaturated carboxylic acid used for preparing the modified ethylenic copolymer by grafting onto the above unmodified ethylenic copolymer are mentioned acrylic acid, methacrylic acid, ethacrylic, acid, crotonic acid, maleic acid, fumaric acid, itaconic acid, citraconic acid and butenedicarboxylic acid.

As examples of the derivative thereof are mentioned alkyl esters, glycidyl esters, acid anhydrides and imides, with glycidyl esters, acid anhydrides and imides are preferable.

Examples of preferable unsaturated carboxylic acids, and derivatives thereof are maleic acid, fumaric acid, glycidyl acrylate, glycidyl methacrylate, glycidyl ethacrylate, diglycidyl itaconate, diglycidyl citraconate, diglycidyl butenedicarboxylate, monoglycidyl ester of butenedicarboxylic acid, maleic anhydride, itaconic anhydride, citraconic anhydride, maleimide, itaconimide and citraconimide, with glycidyl methacrylate, maleic anhydride, itaconic anhydride and maleimide and a mixture thereof being more preferably used.

The grafting amount of the unsaturated carboxylic acid or derivative thereof is preferably at least 0.01% by weight in point of the physical properties, especially face impact resistance, of the composition and at most 10% by weight in point of the heat resistance of the composition, with 0.05 to 5% by weight being most preferable. The grafting reaction or grafting as referred herein means a reaction that the unsaturated carboxylic acid or derivative is chemically bonded to the unmodified ethylenic copolymer.

The modified ethylenic copolymer may be easily prepared by melt-kneading the unmodified ethylenic copolymer, unsaturated carboxylic acid or derivative thereof and 0.001 to 0.1% by weight of an organic peroxide at 150° to 300° C., the melt-kneading may be conducted using a screw extruder, Bambury's mixer or the like.

Examples of the organic peroxide preferably used in the graft reaction include tert-butylcumylperoxide, di-tert-butylperoxide, dicumylperoxide, 2,5-dimethyl-2,5-di(tert-butylperoxy)hexane, 2,5-dimethyl-2,5-di(tert-butylperoxy)hexine-3 and α,α'-di(tert-butylperoxy)-diisopropylbenzene.

Not only one but also two or more of the above olefinic copolymers may be incorporated in the aromatic polyester which forms anisotropic melt.

In the case of incoporating such olefinic copolymer or copolymers in the aromatic polyester, the olefinic copolymer is used preferably in an amount, based on 100 parts by weight of the aromatic polyester, not smaller than 0.1 part by weight to attain the effect of the present invention to a satisfactory extent and not larger than 60 parts by weight to make the most of the advantages of the aromatic polyester forming anisotropic melt, such as excellent fluidity in molding and high heat resistance. The range of 0.5 to 20 parts by weight is particularly preferred. To the anisotropic melt-forming polyester or a composition thereof with the olefinic copolymer, used in the present invention, there may be added additives such as a reinforcing agent such as glass fibers, carbon fibers or asbestos, a filler, a nucleating agent, a pigment, an antioxidant, a stabilizer, a plasticizer, a lubricant, a releasing agent and a flame retardant, as well as a foaming agent or other thermoplastic resins, in a range not impairing the objects of the present invention, to obtain desired characteristics.

The present invention resides in obtaining a multi-layer molded article by multi-layer molding using as at least one layer the anisotropic melt-forming polyester or a composition thereof with the olefinic copolymers.

One outstanding feature of the present invention lies in this point. In more particular temrs, molded articles obtained from conventional anisotropic melt-forming polyesters exhibit a relatively large modulus when they are thin, while their modulus suddenly becomes small with increase in thickness. On the other hand, since the multi-layer molded article of the present invention comprises plural thin layers of high modulus, it can maintain the high modulus of a single layer molded article. That is, even though the multi-layer molded article as a whole is thick, it exhibits a high modulus equal to that of a thin molded article.

It is also possible to obtain a thick injection-molded product of high modulus by multi-layer molding of an isotropic thermoplastic polymer and the anisotropic melt-forming polyester.

Examples of such isotropic thermoplastic polymer are polyethylene terephthalate, polybutylene terephthalate, amorphous polyacrylate, polyester polycarbonate, polysulfone, polyether sulfone, polyether ketone, polyether ether ketone, polyether imide, polyphenylene sulfide, nylon 6, nylon 46, nylon 66, polyethylene, polypropylene, polystyrene, and ABS. The linear thermal expansion coefficient in the flowing direction of the anisotropic melt-forming polyester used in the present invention is in many cases not larger than $10^{-6}$ cm/cm/°C., so it is desirable to add a reinforcing agent, e.g. glass fibers or carbon fibers, or a filler, to the above isotropic thermoplastic polymers to adjust the coefficient of linear thermal expansion to a value not larger than $5 \times 10^{-5}$ cm/cm/°C.

Any of the following combinations may be used to obtain the multi-layer molded article of the present invention:

(a) anisotropic melt-forming polyester (A) /// anisotropic melt-forming polyester (A)

(b) anisotropic melt-forming polyester (A) /// anisotropic melt-forming polyester (B)

(c) anisotropic melt-forming polyester /// isotropic thermoplastic polymer (d) anisotropic melt-forming polyester (A) /// isotropic thermoplastic polymer /// anisotropic melt-forming polyester (A)

(e) anisotropic melt-forming polyester (A) /// isotropic thermoplastic polymer /// anisotropic melt-forming polyester (B)

(f) isotropic thermoplastic polymer /// anisotropic melt-forming polyester /// isotropic thermoplastic polymer The multi-layer molded article can be produced by multi-layer-extrusion, -film forming, or -injection molding.

When the molded article contains a predominant proportion of the anisotropic melt-forming polyester and if it is necessary to reduce its anisotropy, this can be done by performing a multi-layer molding so that the flowing directions of the component layers of the resulting molded article cross each other at an angle not smaller than 30 degrees.

The most desirable molding method employs an injection molding machine having two or more injection units. Examples of such a molding machine are a sandwich injection molding machine [see, for example, Synthetic Resins, 17, (5), 54 ('71)], a two-color injection molding machine (or a multi-material injection modling machine) and a mixed color injection molding machine. Although these injection molding machines are known, the most serious drawback of the anisotropic melt-forming polyester, that is, the reduction in modulus of a thick molded article obtained using such polyester, can be suppressed by the use of those molding machines. This is not inferable at all from the conventional knowledge.

Figure 1:
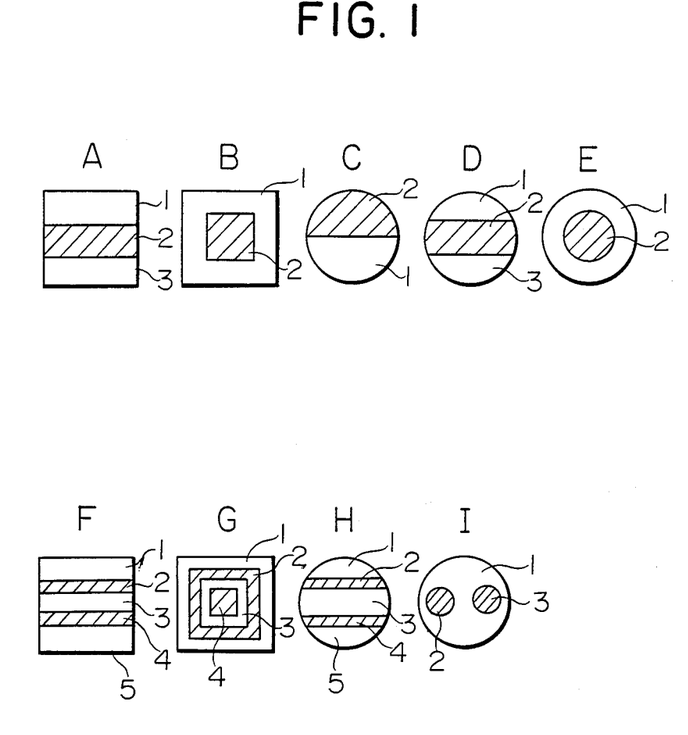

In the manner described above there can be obtained multi-layer molded articles having such various sections as shown in FIGS. 1-A to I. In these figures, the numerals 1 to 5 represent component layers of the same or different polymers. Provided, however, that in each multi-layer molded article, at least one layer is constituted by the anisotropic melt-forming polyester as defined herein or a composition thereof with the olefinic copolymer exemplified previously.

Since the multi-layer molded article of the present invention has a high modulus and excellent impact resistance at a desired thickness, it is particularly useful as a structural member such as an automobile outside plate, including door, fender, roof and bonnet.

The following examples are given to further illustrate the present invention.

Reference Example 1

324 parts by weight of p-acetoxybenzoic acid, 137 parts by weight of chlorohydroquinone diacetate, 162 parts by weight of phenylhydroquinone diacetate and 300 parts by weight of 4,4'-diphenyldicarboxylic acid were charged into a reaction vessel equipped with a stirrer and a distillation tube and de-acetic acid-polymerization was effected. 4,4'-Diphenyldicarboxylic acid was charged in 3.5% excess of stoichiometric amount.

After reacting at 250°–330° C. in nitrogen atmosphere for 1.5 hours without stirring, the stirring began and reaction was effected a further 1.25 hours. Then, after raising the temperature to 350° C., the pressure was gradually reduced and the reaction was effected at 0.5 mmHg a further 1.0 hour to complete polycondensation. About theoretical amount of acetic acid was distilled off to obtain Resin A of the following theoretical formula $l/m/n = 6/2/2$ The determination of optical anisotropy was carried out by heating the polyester on the sample plate of a polarization microscope and it was found to be 261° C. which was good optical anisotropy. The inherent viscosity of the polyester (pentafluorophenol solution, 0.1 g/dl, 60° C.) was 3.20 and the melt viscosity at shear rate of 1000 (1/sec.) and 320° C. was 1,700 poises.

The thermal property of the polymer was determined at a rate of 20° C./min. of temperature rise by DSC-II manufactured by Perkin-Elmar and no melting point was found.

EXAMPLE 1

The polymer A of Reference Example 1 was molded by the following conditions and three-layered injection molded article consisting of three layers in a thickness of 8 mm was obtained.

Using an Sumitomo-NESTAL two-color injection molding machine manufactured by Sumitomo Heavy Machine Industry Co., Ltd. having 25 tons of maximum mold press force, 20.4 cc of maximum injection amount and 1900 kgf/cm² of maximum injection pressure, said aromatic polyester was injection molded at a cylinder temperature of 290°–310° C. and a nozzle temperature of 320° C. to an inner layer a of 3×8×70 nm, and then after reversing the mold both sides of the inner layer was sandwich molded with outer layers b and b of 2.5×8×60 mm using the same polymer. Thus, a injection molded article consisting of three layers in a thickness of 8 mm having a cross-section shown in FIG. 2 was obtained.

In order to determine moduli of the inner and outer layers of the molded article, the three-layer molded article was cut in three layers and bending moduli of each sample were determined at 40 mmm of support span and 1 mm/min. of rate of crosshead motion using TENSILON UTM-4 manufactured by Toyo-Baldwin Co., Ltd.

As shown in Table 1, the bending moduli of the outer layers are all 17.9 GPa and that of the inner layer 20.8 PGa. On the other hand, the bending moduli of the molded article that only the inner layer (thickness; 3 mm) had been injection molded is 21.2 GPa. The bending moduli of these outer and inner layers of the samples obtained by cutting are found to be substantially the same bending moduli as that of the sample obtained by cutting only inner layer though cutting skin layer.

Alternatively, in place of the molded article consisting of three layers a single layer molded article of 8×8×60 cm was injection molded and the single layer molded article was cut in three layers in corresponding thicknesses of the outer layer (thickness, 2.5 mm) and the inner layer (thickness, 3 mm). By measuring their moduli, it is found that the outer layer has 11.5 PGa and the inner layer 10.5 PGa, which are much lower than those of the three-layer molded article of the present invention.

Figure 3:
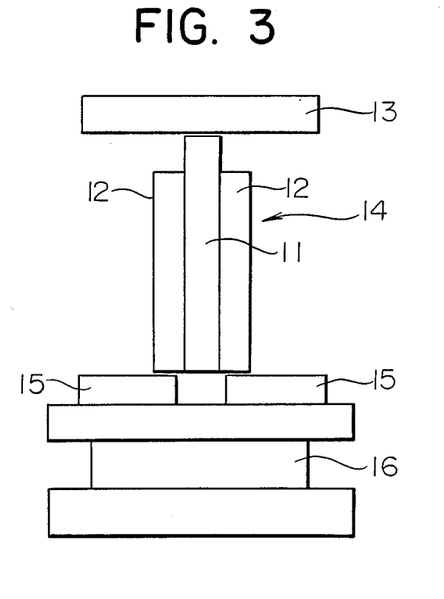
FIG. 3 is a schematic view of an apparatus for measuring an interlayer adhesion of a multi-layer molded article.

When the three-layer injection molded article obtained was cut into two portions lengthwise and the measurement of shear adhesive strength between layers was done using TENSILON UTM-1 manufactured by Toyo-Baldwin Co., Ltd. which is a type of the apparatus shown in FIG. 3, it has 11.6 kg/cm² of higher adhesion strength. In the apparatus of FIG. 3 the three-layer molded article 14 is placed on an aluminum plate 15 which is put on a load cell 16 and pressed downwardly with a crosshead 13. The force at the time of separating the inner layer 11 from the outer layers 12 and 13 is determined.

TABLE 1

|  | Outer layer | Inner layer |
| --- | --- | --- |
| Three layer injection molded article | 17.9 PGa | 20.8 PGa |
| Single layer injection molded article | 11.5 PGa | 10.7 PGa |

Reference Example 2

360 parts by weight of p-acetoxybenzoic acid, 129 parts by weight of hydroquinone diacetate, 167 parts by weight of t-butyl hydroquinone diacetate and 333 parts by weight of 4,4'-diphenylcarboxylic acid were charged into a reaction vessel equipped with a stirrer and a distillation tube and de-acetic acid-polymerization was effected, 4,4'-Diphenylcarboxylic acid was charged in 3.0% excess of theoretical amount. The reaction was carried out at 250°–330° C. in nitrogen atmosphere for 1.5 hours without stirring and then the stirring began at a temperature of 330° C. and the reaction was continued further 1.5 hours. Next, after the temperature was increased stepwise at 350° C. and 360° C. the pressure was gradually reduced to 0.5 mmHg, and at that the pressure the reaction was continued a further 1.25 hours to complete polycondensation. The theoretical amount of acetic acid was distilled off to obtain Resin B of the following theoretical formula $1/m/n = 6/2/2$ The determination of optical anisotropy was carried out by heating the polyester on the sample plate of a polarization microscope and it was found to be 260° C. which was good optical anisotropy. The inherent viscosity of the polyester under the same conditions as in Example 1 was 3.25 and the melt viscosity at shear rate of 1000 (1/sec.) and 320° C. was 5,800 poises. By DSC at a rate of raising temperature of 20° C./min. as in Example 1, melting point and fusion of heat of crystal were determined as 294° C. and 0.08 cal/g respectively.

EXAMPLE 2

Figure 2:
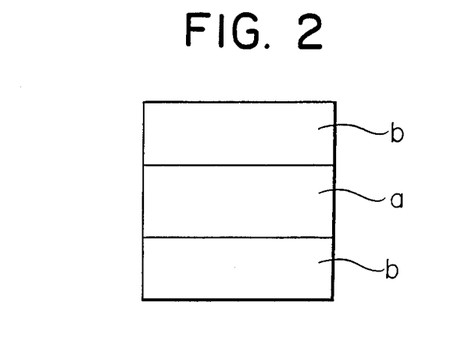
FIG. 2 is a sectional view of a multi-layer molded article obtained in Example 1.

The polymer obtained in Reference Example 2 was molded into a three-layer injection molded article shown in FIG. 2 at a cylinder temperature of 290°–330° C. and a nozzle temperature of 330° C. using the same molding machine, and the bending moduli of the inner and outer layers were determined as in Example 1. The results are shown in Table 2.

TABLE 2

|  | Outer layer | Inner layer |
| --- | --- | --- |
| Three-layer injection molded article | 16.2 PGa | 18.9 PGa |
| Single layer injection molded article | 9.6 PGa | 9.0 PGa |

When the measurement of shear adhesive strength between layers of this three-layer injection molded article was effected as in Example 1, it has a adhesive strength of 3.3 kg/cm².

Reference Example 3 (production of modified ethylenic polymer)

To 100 parts by weight of ethylene/butene-1 copolymer (copolymerized amount of the butene-1; 10 mol%) 2 parts by weight of maleic anhydride and 0.2 part by weight of 2,5-dimethyl-2,5-di(tert-buthylperoxy) hexane were charged into Henchel mixer in nitrogen-atmosphere and mixed for 6 minutes to form a uniform mixture. This mixture was extruded under the conditions of 80 rpm of a screw rotation and 200° C. of a cylinder temperature using an extruder having a diameter of 40 mm which was equipped with a screw with flighted mixing head of L/D 28 to pellets (a) of modified ethylenic copolymer.

After crushing these pellets, acetone was added and unreacted maleic anhydride was extracted for 20 hours with a Soxhlet extracter. Next, after drying the residue they were dissolved in p-xylene and UV absorption spectrum was determined and quantitative analysis of the amount of graft reaction of maleic anhydride was effected. As a result, it is found that maleic anhydride is graft reacted in an amount of 1.8% by weight.

EXAMPLE 3

To 100 parts by weight of Resin A obtained in Reference Example 1, 10 parts by weight of modified ethylenic copolymer a obtained in Reference Example 3 was dry blended and after melt blending pelletized by a single shaft screw extruder at a temperature of 320° C. Pellets of the aromatic polyester composition thus obtained were sandwich molded at a cylinder temperature of 280°–320° C. and a nozzle temperature of 320° C. using the same injection molding machine to obtain a injection molded article having a cross-section of FIG. 2 and consisting of three layers in a thickness of 8 mm. Bending moduli of the inner and outer layers were determined as in Example 1. The results are shown in Table 3.

TABLE 3

| | Outer layer | Inner layer |
|---|---|---|
| Three-layer injection molded article | 14.3 PGa | 16.1 PGa |
| Single layer injection molded article | 8.8 PGa | 8.2 PGa |

By determination of shear adhesive strength between layers, it is found that it has as high as 18.3 kg/cm².

Comparative Example 1

A polymer of the following theoretical formula was obtained.

m/n = 75/25

The determination of optical anisotropy was carried out by heating the polyester on the sample plate of a polarization microscope and it was found to be 251° C. which was good optical anisotropy. The inherent viscosity of the polyester under the same conditions as in Reference Example 1 was 5.38 and the melt viscosity at shear rate of 1000 (1/sec.) and 310° C. was 1,250 poises. By DSC at a rate of raising temperature of 20° C./min. as in Reference Example 1, melting point and fusion of heat of crystal were determined as 275° C. and 0.35 cal/g respectively.

The polymer obtained was molded into a three-layer injection molded article at a cylinder temperature of 260°–300° C. and a nozzle temperature of 300° C. using the same molding machine as in Example 1. There is no adhesion strength between layers at all and delamination between layers occurs simultaneously with taking the molded article out of the mold. The elastisity of the delaminated molded article has lower moduli i.e. 7.7 GPa of the outer layer and 8.0 GPa of the inner layer.

Comparative Example 2

To 100 parts by weight of the resin of Comparative Example 1, 10 parts by weight of modified ethylenic copolymer a obtained in Reference Example 3 was dry blended and pelletized by a single shaft screw extruder at 300° C. after melt mixing. These pellets were injection molded as in Comparative Example 1 to a three-layer injection molded article. And bending moduli of the inner and outer layers were determined as in Example 1. They are lower elastic moduli as shown in Table 4.

TABLE 4

| | Outer layer | Inner layer |
|---|---|---|
| Three-layer injection molded article | 5.2 GPa | 5.3 GPa |
| Single layer injection molded article | 3.1 GPa | 2.4 GPa |

The shear adhesion strength between layers is lower adhesion i.e. less than 2 kg/cm².

Reference Examples 4–6

As in Reference Example 3, maleic anhydride or glycidyl methacrylate was graft reacted with various unmodified ethylenic copolymers shown in Table 5 to obtain modified ethylenic copolymers (b-d).

The result is shown in Table b 5.

TABLE 5

| | Copolymerization ratio in unmodified ethylenic copolymers (mol ratio) | Graft polymerization monomer | Graft reaction amount (wt %) |
|---|---|---|---|
| a | Ethylene/Butene-1 (90/10) | Maleic anhydride | 1.8 |
| b | Ethylene/Propylene (85/15) | " | 1.7 |
| c | Ethylene/Propylene/ Dichloropentadiene (69/30/1) | " | 1.5 |
| d | Ethylene/Butene-1 (90/10) | Glycidyl methacrylate | 1.1 |

Examples 4 and 6

To 100 parts by weight of Resin A obtained in Reference Example 1, 10 parts by weight of the modified ethylenic copolymers b-d obtained in Reference Examples were dry blended and pelletized by a single shaft extruder at 300° C. after melt mixing.

These pellets were injection molded as in Example 1 to a three-layer injection molded article. And bending moduli of the inner and outer layers and shear adhesive strength between layers were determined as in Example 1. The result is shown in Table 6.

Example 7

To 100 parts by weight of Resin A obtained in Reference Example 1, 10 parts by weight of ethylene-glycidyl methacrylate (96/4 mol) was dry blended and pelletized by a single shaft extruder at 320° C. after melt mixing.

These pellets were injection molded as in Example 1 to a three-layer injection molded article. And bending moduli of the inner and outer layers and shear adhesive strength between layers were determined as in Example 1. The result is shown in Table 6.

Examples 8 and 9

To 100 parts by weight of Resin B obtained in Reference Example 2, 10 parts by weight of modified ethylenic copolymer a obtained in Reference Example 3 or 10 parts by weight of ethylene-glycidyl methacrylate (96/4 mol) was olefinic polymer was dry blended and pelletized by a single shaft extruder at 320° C. after melt mixing. These pellets were molded under the conditions of 330° C. of a cylinder temperature and 30° C. of a mold temperature as in Example 1 to a three-layer injection molded article. And bending moduli of the inner and outer layers and shear adhesive strength between layers were determined as in Example 6. The result is shown in Table 6.

Reference Example 7

343 Parts by weight of methylhydroquinone di-acetate, 327 parts by weight of 4,4'-diphenylcarboxylic acid and 45 parts by weight of 1,2'-bis(phenoxy)ethane-4,4'-dicarboxylic acid were charged into a reaction vessel equipped with a stirrer and a distillation tube, and reacted at 250°–330° C. in nitrogen gas atmosphere for 1.5 hours without stirring. Then stirring began at 330° C. and the reaction was continued a further 1.5 hours. After raising the temperature stepwise at 350° C. and 370° C., the pressure within the system was reduced gradually and at 0.5 mmHg the reaction was continued a further 1.0 hour to complete polycondensation. About theoretical amount of acetic acid was distilled off to obtain Resin C of the following theoretical formula $m/n = 9/1$ The determination of optical anisotropy was carried out by heating the polyester on the sample plate of a polarization microscope and it was found to be 295° C. The inherent viscosity of the polyester under the same conditions as in Reference Example 1 was 3.10 and the melt viscosity at shear rate of 1000 (1/sec.) and 355° C. was 6,100 poises. By DSC at a rate of raising temperature of 20° C./min. as in Reference Example 1, melting point and fusion of heat of crystal were determined as 341° C. and 0.33 cal/g respectively.

Example 10

To 100 parts by weight of Resin C obtained in Reference Example 7, 10 parts by weight of modified ethylenic copolymer a obtained in Reference Example 3 was dry blended and pelletized by a single shaft extruder at 350° C. after melt mixing. These pellets of aromatic polyester composition were sandwich molded under the conditions of 300°–350° C. of a cylinder temperature and 350° C. of a nozzle temperature using the same molding machine as in Example 1 to three-layer injection molded article having a cross-section shown in FIG. 2 and a thickness of 8 mm. And bending moduli of the inner and outer layers were determined as in Example 1. The result is shown in Table 6.

It is found that by measuring the shear adhesion strength between layers it has as high as 9.8 kg/cm$^2$.

TABLE 6

| Ex. No. | Resin | Olefinic polymer (wt. parts) | Shear adhesion of three layer molded article (kg/cm$^2$) | Bending Moduli (GPa) | |
|---|---|---|---|---|---|
| | | | | Outer layer | Inner layer |
| 3 | A | Modified ethylenic copolymer a (10) | 18.3 | 14.3 | 16.1 |
| 4 | A | Modified ethylenic copolymer b (10) | 16.2 | 13.6 | 15.2 |
| 5 | A | Modified ethlenic copolymer c (10) | 15.4 | 14.1 | 16.2 |
| 6 | A | Modified ethylenic copolymer d (10) | 12.6 | 13.0 | 14.3 |
| 7 | A | Ethylene-glycidyl methacrylate copolymer (10) | 12.3 | 15.2 | 16.8 |
| 8 | B | Modified ethylenic copolymer a (10) | 9.2 | 12.8 | 15.0 |
| 9 | B | Ethylene-glycidyl methacrylate copolymer (10) | 8.9 | 13.7 | 16.0 |
| 10 | C | Modified ethylenic copolymer a (10) | 9.8 | 12.9 | 15.8 |

Example 11

The polymer of Reference Example 1 and polyethylene terephthalate containing 30% of glass fiber (du Pont, RYNITE 530) were injection molded using the same molding machine as in Example 1 as follows.

After injection molding an inner layer using RYNITE 530 at 270°–280° C. of a cylinder temperature and 280° C. of a nozzle temperature, the mold was reversed and both sides of the inner layer were sandwich molded (cylinder temperature, 290°–310° C.; nozzle temperature, 320° C.) with the molded articles of 2.5×8×60 mm of the polymer in Reference Example 1 to obtain a injection molded article consisting of three layers in a thickness of 8 mm.

In this molded article the outer layer (the polymer of Reference Example 1) and the inner (RYNITE 530) are bonded satisfactorily and by determining their moduli the outer layer (the polymer of Reference Example 1) and the inner layer (RYNITE 530) have higher bending moduli i.e. 1.67 GPa and 9.8 GPa respectively and the shear adhesive strength is 8.3 kg/cm$^2$.

What is claimed is:

1. A multi-layer molded article comprising at least one layer formed by an anisotropic melt-forming polyester having at least one structural unit selected from the following structural units (I) to (III), the molar ratio of (I)/[(I)+(II)+(III)] being in the range of 20 to 100 mol%, the molar ratio of (II)/[(I)+(II)+(III)] being in the range of 0-80 mol% and the molar ratio of (III)/[(I)+(II)+(III)] being in the range of 0-75 mol%:

wherein X represents at least one group selected from

Y represents at least one group selected from and Z represents at least one group selected from and wherein the layers constituting the multi-layered molded article are the same or different polymer layers and adhesion between adjacent layers is made simultaneously when at least one layer is formed.

2. A multi-layer molded article as set forth in claim 1, wherein said polyester has a molar ratio of (I)/[(I)+(II)+(III)] in the range of 50 to 100%, and a molar ratio of (II)/[(I)+(II)+(III)] is 0-50 mol%.

3. A multi-layer molded article as set forth in claim 1, wherein said polyester has a molar ratio of (I)/[(I)+(II)] in the range of 70 to 100 mol%.

4. A multi-layer molded article as set forth in claim 1, wherein said polyester exhibits a heat of fusion not greater than 0.1 cal/g as measured at a heat-up rate of 20° C./min. using a differential scanning calorimeter (DSC).

5. A multi-layer molded article containing as at least one layer an aromatic polyester composition comprising the polyester described in claim 1 and 0.1 to 60 parts by weight, based on 100 parts by weight of the polyester described in claim 1, of an olefinic polymer.

6. A multi-layer molded article as set forth in claim 5, wherein said olefinic polymer is a copolymer of an α-olefin and a glycidyl ester of an α,β-unsaturated acid.

7. A mulit-layer molded article as set forth in claim 5, wherein said olefinic polymer is a modified ethylenic polymer prepared by grafting 0.01-10% by weight of an unsaturated carboxylic acid or a derivative thereof to a copolymer of ethylene and an α-olefin having not less than 3 carbon atoms or a copolymer of ethylene, an α-olefin having not less than 3 carbon atoms and a nonconjugated diene.

8. A multi-layer molded article as set forth in claim 1 or 5, wherein all of the layers are formed by one kind of the anisotropic melt-forming polyester or the aromatic polyester composition.

9. A multi-layer molded article as set forth in claim 1 or 5, comprising layers of two or more kinds of the anisotropic melt-forming polyesters or the aromatic polyester composition.

10. A multi-layer molded article as set forth in claim 1 or 5, comprising layers of the anisotropic melt-forming polyester or the aromatic polyester composition and of an isotropic thermoplastic polymer.

11. A multi-layer molded article as set forth in claim 10, wherein at least one layer is constituted by a composition comprising the isotropic thermoplastic polymer and a reinforcing agent or a filler incorporated therein.

* * * * *